US011837861B2

United States Patent
Ishida et al.

(10) Patent No.: US 11,837,861 B2
(45) Date of Patent: Dec. 5, 2023

(54) WIRING MEMBER AND WIRING MEMBER IN PACKAGED FORM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hidetoshi Ishida, Mie (JP); Yasuyuki Yamamoto, Mie (JP); Haruka Nakano, Mie (JP); Suguru Yasuda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 274 days.

(21) Appl. No.: 17/296,694

(22) PCT Filed: Dec. 12, 2018

(86) PCT No.: PCT/JP2018/045662
§ 371 (c)(1),
(2) Date: May 25, 2021

(87) PCT Pub. No.: WO2020/121434
PCT Pub. Date: Jun. 18, 2020

(65) Prior Publication Data
US 2022/0029400 A1    Jan. 27, 2022

(51) Int. Cl.
*H02G 3/30* (2006.01)
*B60R 16/02* (2006.01)
*H01B 13/012* (2006.01)

(52) U.S. Cl.
CPC ............ *H02G 3/30* (2013.01); *B60R 16/0207* (2013.01); *B60R 16/0215* (2013.01); *H01B 13/01209* (2013.01)

(58) Field of Classification Search
CPC .. H02G 3/30; B60R 16/0207; B60R 16/0215; H01B 13/01209
(Continued)

(56) References Cited

U.S. PATENT DOCUMENTS 3,733,428 A * 5/1973 Fry ...................... H01B 7/0846
156/290
3,819,848 A * 6/1974 Fry ...................... H01B 7/0846
174/72 A
(Continued)

FOREIGN PATENT DOCUMENTS

JP    2002-267852 A    9/2002
JP    2014-202817 A    10/2014
(Continued)

OTHER PUBLICATIONS

International Search Report dated Jan. 22, 2019 for WO 2020/121434 A1 (2 pages).

*Primary Examiner* — Timothy J Thompson
*Assistant Examiner* — Michael F McAllister
(74) *Attorney, Agent, or Firm* — Venjuris, P.C.

(57) ABSTRACT

The present invention aims to suppress a case in which paths of linear transmission members are disturbed on a sheet-shaped member or the linear transmission members separate from the sheet-shaped member. The wiring member includes a sheet-shaped member and multiple linear transmission members that are fixed on the sheet-shaped member. The multiple linear transmission members are fixed on the sheet-shaped member such that a portion of the multiple linear transmission members intersects with respect to another said linear transmission member. An intersection location of the
(Continued)

multiple linear transmission members is located away from a folding track.

5 Claims, 3 Drawing Sheets

(58) Field of Classification Search
USPC .................................................. 174/129 R
See application file for complete search history.

(56) References Cited

U.S. PATENT DOCUMENTS

| | | | | |
|---|---|---|---|---|
| 3,898,371 A * | 8/1975 | Bridgett | ............... | H01B 7/0846 |
| | | | | 174/72 A |
| 4,065,199 A * | 12/1977 | Andre | ...................... | H01B 7/08 |
| | | | | 174/72 A |
| 4,219,928 A * | 9/1980 | Kuo | ...................... | H01B 7/0838 |
| | | | | 174/117 FF |
| 5,651,694 A * | 7/1997 | Miyasaka | ............... | H05K 1/118 |
| | | | | 439/492 |
| 6,439,923 B1 * | 8/2002 | Kirkendall | ............. | H01R 27/02 |
| | | | | 439/502 |
| 6,702,607 B2 * | 3/2004 | Kondo | ................ | B60R 16/0207 |
| | | | | 174/72 A |
| 6,723,925 B2 * | 4/2004 | Ohara | ................. | B60R 16/0207 |
| | | | | 174/117 FF |
| 8,878,063 B2 * | 11/2014 | Mantock | ................... | H01B 7/30 |
| | | | | 174/117 FF |
| 9,462,684 B2 * | 10/2016 | Tanaka | .................... | H05K 1/028 |
| 9,825,394 B2 * | 11/2017 | Naganishi | .............. | H01R 11/09 |
| 2002/0028600 A1 * | 3/2002 | Kondo | .................... | H05K 1/118 |
| | | | | 439/502 |
| 2003/0102148 A1 * | 6/2003 | Ohara | ...................... | H01B 7/08 |
| | | | | 174/117 F |
| 2014/0131071 A1 * | 5/2014 | Tanaka | ................... | H05K 1/028 |
| | | | | 174/254 |
| 2014/0332267 A1 * | 11/2014 | Tanaka | ............. | H01B 13/01254 |
| | | | | 72/370.26 |
| 2015/0266435 A1 * | 9/2015 | Wakabayashi | ....... | H02G 3/0481 |
| | | | | 174/72 A |
| 2015/0329069 A1 * | 11/2015 | Daugherty | .......... | B60R 16/0207 |
| | | | | 174/72 A |
| 2016/0059801 A1 * | 3/2016 | Katsuramaki | ....... | B60R 16/0215 |
| | | | | 191/12.2 R |
| 2019/0392963 A1 | 12/2019 | Ishida et al. | | |

FOREIGN PATENT DOCUMENTS

| | | | |
|---|---|---|---|
| JP | 2015118731 | * | 6/2015 |
| JP | 2016-015852 A | | 1/2016 |

* cited by examiner

WIRING MEMBER AND WIRING MEMBER IN PACKAGED FORM

CROSS REFERENCE TO RELATED APPLICATIONS

This application is a national phase of PCT application No. PCT/JP2018/045662, filed on 12 Dec. 2018, of which is incorporated herein by reference.

TECHNICAL FIELD

The present invention relates to a wiring member.

BACKGROUND

Patent Document 1 discloses a wire harness including a functional outer covering member formed into a sheet shape, and wires disposed so as to overlap with the functional outer covering member in at least a partial region along a lengthwise direction, in which at least part of the portion at which insulating coverings of the wires and the functional outer covering member overlap with each other is welded.

PRIOR ART DOCUMENT

Patent Document

Patent Document 1: JP 2018-137208A

SUMMARY OF THE INVENTION

Problems to be Solved

The wire harness disclosed in Patent Document 1 can be made into a compact form by folding the functional outer covering member formed into a sheet shape during packaging, transport, or the like.

However, if the wire harness is folded, there is a risk that the paths of the wires will be disturbed on the functional outer covering member and separation will occur. For example, with the wire harness disclosed in Patent Document 1, a case is possible in which, according to the paths of the wires, the positions at which the wires are connected to the connector, and the like, one of the wires is disposed intersecting so as to span over another wire on the sheet-shaped function outer covering member. There is a risk that the holding force of the wire spanning over the other wire will weaken at the wire intersection portion. For this reason, if the functional outer covering member is folded at the wire intersection portion, there is a risk that the paths of the wires will be disturbed on the functional outer covering member or separation will occur.

In view of this, the present invention aims to suppress a case in which paths of linear transmission members are disturbed on a sheet-shaped member or the linear transmission members separate from the sheet-shaped member.

Means to Solve the Problem

In order to resolve the above-described problem, a wiring member according to a first aspect is a wiring member including: a sheet-shaped member; and a plurality of linear transmission members fixed on the sheet-shaped member, in which the plurality of linear transmission members are fixed on the sheet-shaped member such that a portion of the plurality of linear transmission members intersects another said linear transmission member, and an intersection location of the plurality of linear transmission members is located away from a folding track.

A second aspect is the wiring member according to the first aspect, further including a vehicle fixing portion attached to the sheet-shaped member, in which the intersection location of the plurality of linear transmission members includes an intersection location that is located in a region of the sheet-shaped member that corresponds to the vehicle fixing portion.

A third aspect is the wiring member according to the first or second aspect, in which the intersection location of the plurality of linear transmission members includes an intersection location that is located near an end portion between a central portion in an extension direction of the sheet-shaped member and the end portion.

A fourth aspect is the wiring member according to any one of the first to third aspects, in which a rigidity providing member that provides rigidity to the intersection location is provided.

A wiring member in a packaged form according to a fifth aspect is a wiring member in a packaged form, including: a sheet-shaped member; and a plurality of linear transmission members fixed on the sheet-shaped member, in which the plurality of linear transmission members are fixed on the sheet-shaped member such that a portion of the plurality of linear transmission members intersects another said linear transmission member, the sheet-shaped member and the plurality of linear transmission members are folded to be put in a packaged form, and an intersection location of the plurality of linear transmission members is located away from a folding location.

Effect of the Invention

According to the first aspect, the intersection locations of the plurality of linear transmission members are located away from the folding track of the sheet-shaped member, and therefore the sheet-shaped member is folded away from the intersection locations of the plurality of linear transmission members during packaging, shipping, and the like. For this reason, a case is suppressed in which the paths of the linear transmission members are disturbed on the sheet-shaped member or the linear transmission members separated from the sheet-shaped member.

Normally, the sheet-shaped member is folded at a position away from the vehicle fixing portion. For this reason, according to the second aspect, the wiring member is not folded at the intersection locations, and a case is suppressed in which the paths of the linear transmission members are disturbed on the sheet-shaped member or the linear transmission members separate from the sheet-shaped member.

Since the wiring member is folded during packaging, shipping, and the like in order to achieve compactness, there is little likelihood that the wiring member will be folded at a position near the end portion of the sheet-shaped member. In view of this, due to the intersection locations of the plurality of linear transmission members being located near the end portion between the central portion in the extension direction of the sheet-shaped member and the end portion as in the third aspect, there is less likelihood that the intersection locations of the plurality of linear transmission members will be folded, and a case is suppressed in which the paths of the linear transmission members are disturbed on the sheet-shaped member or the linear transmission members separate from the sheet-shaped member.

According to the fourth aspect, the wiring member is less likely to be folded at the intersection location since the rigidity providing member that provides rigidity is provided at the intersection location. For this reason, a case is suppressed in which the paths of the linear transmission members are disturbed on the sheet-shaped member or the linear transmission members separate from the sheet-shaped member.

According to the fifth aspect, the intersection locations of the plurality of linear transmission members are located away from the bending location of the sheet-shaped member, and therefore a case is suppressed in which the paths of the linear transmission members are disturbed on the sheet-shaped member or the linear transmission members separate from the sheet-shaped member.

DETAILED DESCRIPTION TO EXECUTE THE INVENTION

Figure 1:
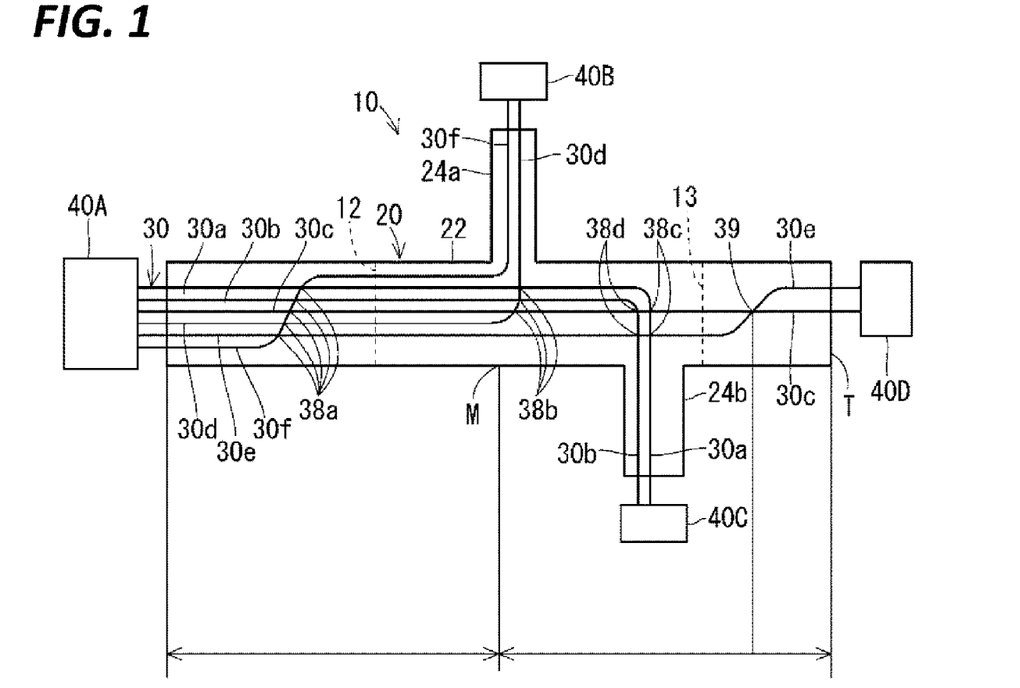
FIG. 1 is an overall plan view showing a wiring member according to an embodiment.
Figure 2:
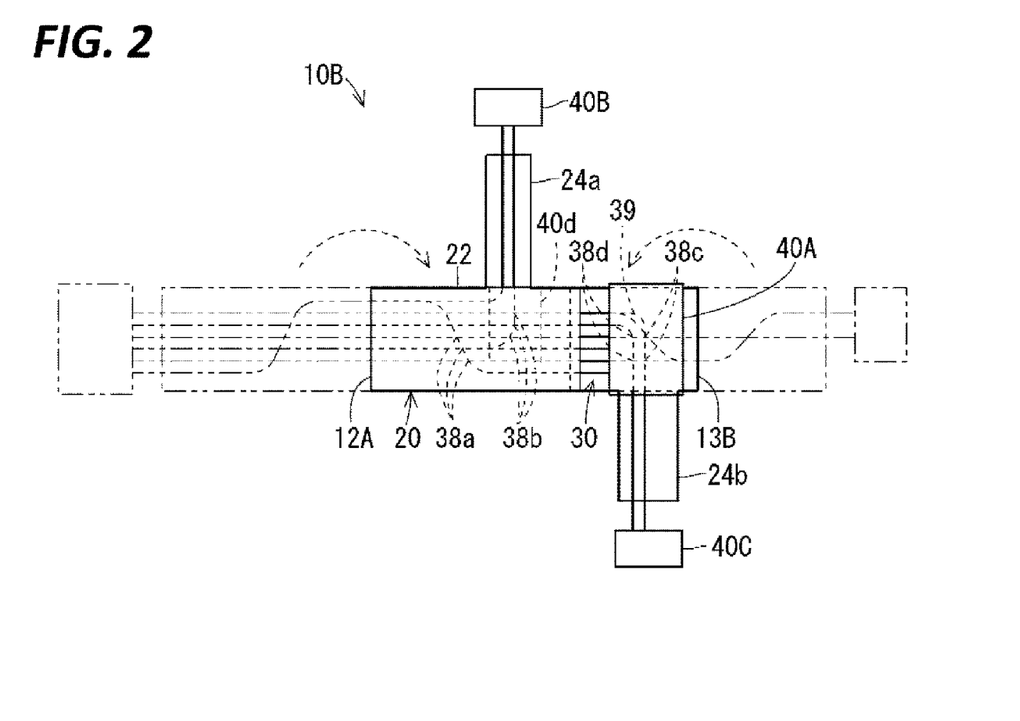
FIG. 2 is an overall plan view showing a wiring member in a packaged form.

Hereinafter, a wiring member according to an embodiment will be described. FIG. 1 is an overall plan view showing a wiring member 10, and FIG. 2 is an overall plan view showing a state in which the wiring member 10 has been folded up, that is, a wiring member 10B in a packaged form.

The wiring member 10 includes a sheet-shaped member 20 and multiple linear transmission members 30. In the present example, the wiring member 10 also includes connectors 40A, 40B, 40C, and 40D.

The linear transmission member 30 is a linear member that transmits electricity or light. The sheet-shaped member 20 is a member in the form of a sheet. The multiple linear transmission members 30 are fixed on the sheet-shaped member 20. A portion of the multiple linear transmission members 30 is fixed on the sheet-shaped member 20 so as to intersect another linear transmission member 30. Folding tracks 12 and 13 are formed on the wiring member 10. That is, when the wiring member 10 is packaged, shipped, or the like, the wiring member 10 is folded and put in a compact packaged form. The folding tracks 12 and 13 are tracks along which the wiring member 10 is folded when formed in the packaged form. In the folding of the wiring member 10, the wiring member 10 need only be folded to such an extent that a portion of the wiring member 10 can overlap with another portion. A case in which the folding tracks 12 and 13 remain as creases on the sheet-shaped member 20, a case in which the folding tracks 12 and 13 remain as creases on the linear transmission members 30, and the like are envisioned. The multiple linear transmission members 30 intersect on the sheet-shaped member 20, and the intersection locations 38a, 38b, 38c, 38d, and 39 are located away from the folding tracks 12 and 13.

The connectors 40A, 40B, 40C, and 40D are components that are to be connected to components mounted in a vehicle. The end portions of the multiple linear transmission members 30 are each connected to one of the connectors 40A, 40B, 40C, and 40D. Due to the connectors 40A, 40B, 40C, and 40D being connected to the partner-side connectors mounted in the vehicle, the linear transmission members 30 and the corresponding components are electrically connected or are connected so as to be able to transmit and receive optical signals.

In a state in which the wiring member 10 is mounted in the vehicle, the multiple connectors 40A, 40B, 40C, and 40D are connected to respective components mounted in the vehicle. Accordingly, transmission and reception of electrical signals, transmission and reception of electricity, and transmission and reception of optical signals are performed between the components mounted in the vehicle. That is, the wiring member 10 is a wiring component that connects components mounted in the vehicle. In particular, in the wiring member 10, due to the fact that the multiple linear transmission members 30 branch, it is possible to connect multiple components via a branched route.

The portions will be described more specifically.

The linear transmission member 30 need only be a linear member that transmits electricity, light, or the like. For example, the linear transmission member may be a common wire having a core wire and a covering around the core wire, and may also be a bare conductive wire, a shielded wire, an enamel wire, a nichrome wire, an optical fiber, or the like. Various types of signal lines and various types of power lines may also be used as a linear transmission member that transmits electricity. A linear transmission member that transmits electricity may also be used as an antenna, a coil, or the like that sends signals or electricity to a space or receives signals or electricity from a space.

Here, description will be given assuming that the linear transmission member 30 is a common wire 30 (hereinafter simply referred to as a wire 30). The wire 30 includes a core wire serving as a transmission wire main body and an insulating covering serving as a covering that covers the core wire. The descriptions relating to the wire can be applied to each illustrated object of the linear transmission member, except for configurations to which they cannot be applied.

The core wire is constituted by one or multiple strands. The strand is constituted by a conductor such as copper, a copper alloy, aluminum, or an aluminum alloy. If the core wire is constituted by multiple strands, the multiple strands may also be twisted. The insulating covering is formed due to a resin material such as PVC (polyvinyl chloride) or PE (polyethylene) being extrusion molded around the core wire or the like. Here, the wire 30 is a so-called round wire with a circular transverse cross section.

The sheet-shaped member 20 is a flexible sheet-shaped member that can hold the wires 30 in a state of being positioned two-dimensionally, and that can be folded.

Although there is no particular limitation on the material constituting the sheet-shaped member 20, the sheet-shaped member 20 is preferably constituted by a material including a resin such as PVC (polyvinyl chloride), PET (polyethylene terephthalate), or PP (polypropylene). The sheet-shaped member 20 may also be a sheet member in which the interior is uniformly embedded, a nonwoven sheet, or the like. The sheet-shaped member 20 can also include a material such as a metal. The sheet-shaped member 20 may also be a single layer, or multiple layers may be stacked. If multiple layers are stacked, for example, it is conceivable that resin layers are stacked. Also, for example, it is conceivable that a resin layer and a metal layer are stacked.

The wires 30 are fixed on one main surface of the sheet-shaped member 20. The wires 30 are fixed along a certain path on the one main surface of the sheet-shaped member 20.

Multiple wires 30 are fixed on the one main surface of the sheet-shaped member 20. The paths of the wires 30 on the sheet-shaped member 20 may be linear or may be paths that bend at an intermediate location. The multiple wires 30 branch at an intermediate location on the one main surface of the sheet-shaped member 20.

More specifically, the sheet-shaped member 20 includes a first sheet-shaped portion 22 and second sheet-shaped portions 24a and 24b. The second sheet-shaped portions 24a and 24b bend at intermediate portions in the extension direction of the first sheet-shaped portion 22 and branch to the sides of the first sheet-shaped portion 22. Here, the first sheet-shaped portion 22 is formed into a band shape that is elongated and extends straight. The first sheet-shaped portion may also be bent. The second sheet-shaped portions 24a and 24b are formed into band shapes that are elongated and extend straight. The second sheet-shaped portion 24a branches so as to extend from an intermediate portion in the extension direction of one side portion of the first sheet-shaped portion 22 toward the outside of one side of the first sheet-shaped portion 22. The second sheet-shaped portion 24b branches so as to extend from an intermediate portion in the extension direction of the other side portion of the first sheet-shaped portion 22 to the outside of the other side of the first sheet-shaped portion 22. Here, the second sheet-shaped portions 24a and 24b are provided at different locations in the extension direction of the first sheet-shaped portion 22. Here, the second sheet-shaped portion 24a is provided near one end of the first sheet-shaped portion 22 and the second sheet-shaped portion 24b is provided near another end of the first sheet-shaped portion 22. If multiple second sheet-shaped portions are provided, two of the second sheet-shaped portions may also be provided at the same position in the extension direction of the first sheet-shaped portion. Also, the second sheet-shaped portions 24a and 24b extend in an orientation that is orthogonal to the extension direction of the first sheet-shaped portion 22. The second sheet-shaped portions may also extend in an oblique direction with respect to the extension direction of the first sheet-shaped portion. There may also be 1 or 3 or more second sheet-shaped portions.

For the sake of convenience, the multiple wires 30 are distinguished as wires 30a, 30b, 30c, 30d, 30e, and 30f. Hereinafter, if it is necessary to distinguish the wires 30, distinguishing will be performed using the same reference numerals. The multiple wires 30a, 30b, 30c, 30d, 30e, and 30f are fixed to the first sheet-shaped portion 22 in an aligned state on one end side of the first sheet-shaped portion 22. The multiple wires 30a, 30b, 30c, 30d, 30e, and 30f are connected to a connector 40A at one end portion of the first sheet-shaped portion 22. The connector 40A is constituted such that terminals are stored in a housing in a predetermined alignment sequence. The alignment of the multiple wires 30a, 30b, 30c, 30d, 30e, and 30f is determined according to the alignment in which the terminals connected to the multiple wires 30a, 30b, 30c, 30d, 30e, and 30f are stored in the housing. The connector 40A may also be fixed to the sheet-shaped member 20. The end portions of the wires 30a, 30b, 30c, 30d, 30e, and 30f may also extend from the sheet-shaped member 20 and be connected to the connector 40A. The same applies to the other connectors 40B, 40C, and 40D as well.

A portion of the wires 30f is bent at an intermediate location at an intermediate portion between one end of the first sheet-shaped member 22 and the second sheet-shaped member 24a in the extension direction of the first sheet-shaped portion 22, and intersects the other wires 30a, 30b, 30c, 30d, and 30e in an oblique orientation. The locations at which the wire 30f intersects the wires 30a, 30b, 30c, 30d and 30e are examples of intersection locations 38a. Due to the fact that the wire 30f intersects the wires 30a, 30b, 30c, 30d, and 30e in an oblique orientation, the wire 30f can be bent at a moderate angle. The wire 30f is fixed at an intermediate portion in the extension direction of the first sheet-shaped portion 22 in a state of being aligned with the other wires 30a, 30b, 30c, 30d, and 30e from the intersection location 38a to the other end of the first sheet-shaped portion 22. The wire 30f bends toward a first side portion of the first sheet-shaped portion 22 at the location at which the second sheet-shaped portion 24a is provided, branches with respect to the other wires 30a, 30b, 30c, and 30e, and extends toward the second sheet-shaped member 24a. Another partial wire 30d bends from an original position at an intermediate location at a location at which the second sheet-shaped portion 24a is provided, branches with respect to the other wires 30a, 30b, 30c, and 30e, and extends toward the second sheet-shaped portion 24a. On the second sheet-shaped portion 24a, some wires 30d and 30f branch with respect to the other wires 30a, 30b, 30c, and 30e, extend in an orientation of being orthogonal thereto, and are fixed in an aligned state on the second sheet-shaped portion 24a. The locations at which the wire 30d intersects the other wires 30a, 30b, and 30c are examples of intersection locations 38b. The intersection locations 38a and 38b are examples of locations at which a portion of the plurality of linear transmission members intersects so as to branch with respect to the other linear transmission members.

The wires 30d and 30f are connected to the connector 40B at the end portion of the second sheet-shaped portion 24a. The alignment sequence of the wires 30d and 30f is also determined according to the arrangement in which the terminals connected to the end portions of the wires 30d and 30f are stored in the connector 40B.

Some wires 30a and 30b are bent from the original portions at an intermediate portion and branch with respect to the other wires 30c and 30e at an intermediate portion in the extension direction of the first sheet-shaped portion 22, which is a position located away from the other end side of the first sheet-shaped portion 22 relative to the above-described wires 30d and 30f. Some wires 30a and 30b extend in an orientation of branching and being orthogonal with respect to the other wires 30c and 30e. The bend radii of the wires 30a and 30b may be the same as, smaller than, or greater than the interval of the wires 30a, 30b, 30c, 30d, 30e, and 30f. Here, the locations at which the wire 30a intersects the other wires 30c and 30e are intersection locations 38c. Also, the locations at which the wire 30b intersects the other wires 30c and 30e are intersection locations 38d. The intersection locations 38c and 38d are examples of locations at which a portion of the plurality of linear transmission members intersect so as to branch with respect to the other linear transmission members.

The wires 30a and 30c branch with respect to the other wires 30c and 30e on the first sheet-shaped portion 22, extend toward the second sheet-shaped portion 24b, and are fixed in an aligned state on the second sheet-shaped portion 24b. The wires 30a and 30b are connected to the connector 40C at the end portion of the second sheet-shaped portion 24b. The alignment sequence of the wires 30a and 30b is also determined according to the arrangement in which terminals to be connected to the end portions of the wires 30a and 30b are stored in the connector 40C.

The remaining wires 30c and 30e extend toward the other end portion of the first sheet-shaped portion 22. The alignment sequence of the wires 30c and 30e at the other end portion of the first sheet-shaped portion 22 is determined according to the arrangement in which terminals to be connected to the end portions of the wires 30a and 30b are stored in the connector 40D. Here, the alignment sequence of the wires 30c and 30e at the other end portion of the first sheet-shaped portion 22 and the alignment sequence of the wires 30c and 30e at the one end portion of the first sheet-shaped portion 22 differ from each other according to the storage positions of the terminals in the connectors 40A and 40D. In view of this, the wire 30e bends at an intermediate portion and intersects the wire 30c such that the alignment sequence of the multiple wires 30c and 30e is changed. Here, at an intermediate portion between the intersection locations 38c and 38d and the other end portion of the first sheet-shaped portion 22, the wire 30e is bent so as to intersect the wire 30c, and extends parallel to the wire 30c at a position near the other end portion of the first sheet-shaped member 22. Here, the wire 30e intersects the wire 30c in an oblique orientation, and the portions on both sides of the wire 30e that intersect the wire 30c extend in a parallel orientation with respect to the wire 30c. Due to the fact that the wire 30e intersects the wire 30c in an oblique orientation, it is possible to make the bending of the wire 30e moderate. The portions between the portion of the wire 30e that intersects the wire 30c and the portions of the wire 30e that extend parallel to the wire 30c are bent curvilinearly. Similarly to the above description, the bend radii may be the same as, smaller than, or greater than the interval of the wires 30a, 30b, 30c, 30d, 30e, and 30f. The intersection location 39 of the wire 30c and the wire 30e is an example of a location at which the wire 30c and the wire 30e intersect each other such that the alignment sequence of the wires 30c and 30e is changed. The wires 30c and 30e are fixed in an aligned state on the other end portion of the first sheet-shaped portion 22. The wires 30c and 30e are connected to the connector 40D at the other end portion of the first sheet-shaped portion 22.

Folding tracks 12 and 13 are formed on the wiring member 10. The folding tracks 12 and 13 are tracks along which the wiring member 10 was folded in order to put it in a compact packaged form for the purpose of packaging, shipping, or the like. Here, the wiring member 10 is folded at two locations in the extension direction of the first sheet-shaped portion 22. The folding lines (lines that are to be the folding tracks 12 and 13 when the wiring member 10 is expanded after being folded) are orthogonal to the extension direction of the first sheet-shaped portion 22. One folding line (corresponds to the folding track 12) is located between one end portion of the first sheet-shaped portion 22 and the second sheet-shaped portion 24a. The other folding line (corresponds to the folding track 13) is located between the other end portion of the first sheet-shaped portion 22 and the second sheet-shaped portion 24b, near the second sheet-shaped portion 24b. The method of folding the wiring member 10 is not limited to the above example, and the wiring member 10 may also be folded at one location or three or more locations. The wiring member 10 may also be folded along a line that is oblique with respect to the extension direction of the first sheet-shaped portion 22.

The above-described intersection locations 38a, 38b, 38c, 38d, and 39 are located away from the folding tracks 12 and 13. More specifically, the intersection location 38a is located near one end of the first sheet-shaped portion 22 with respect to the bending track 12 on the first sheet-shaped portion 22. On the first sheet-shaped portion 22, the intersection locations 38b, 38c, and 38d are located between the bending track 12 and the bending track 13. The intersection location 39 is located near the other end of the first sheet-shaped portion 22 with respect to the bending track 13 on the first sheet-shaped portion 22.

The intersection locations 38a and 39 may also be located near the end portion between the central portion M in the extension direction of the sheet-shaped member 20 and the end portion. Here, the longest first sheet-shaped portion 22 of the sheet-shaped member 20 is used as a reference, and the central portion in the extension direction thereof is set as M. The intersection location 39 is present at a position near another end portion T between the central portion M and the other end portion T of the first sheet-shaped portion 22. Since the sheet-shaped member 20 is folded in order to make it as compact as possible, folding the sheet-shaped member 20 at the end portion has little effect on the requirement of compactness. For this reason, since the sheet-shaped member 20 is not often folded at the end portion, a case is suppressed in which the intersection location 39 is folded by providing the intersection location 39 at a position near the end portion T.

Note that the mode by which the wires 30 and the sheet-shaped member 20 are fixed to each other may be contact site fixing, non-contact site fixing, or both. Here, in contact site fixing, the portions at which the wires 30 and the sheet-shaped member 20 are in contact with each other are fixed by sticking together. Also, non-contact site fixing is a fixing mode that is not contact site fixing. For example, a thread, another sheet member, adhesive tape, or the like presses the wires 30 into the sheet-shaped member 20, a thread, another sheet member, adhesive tape, or the like sandwich the wires 30 and the sheet-shaped member 20 in a state of surrounding the wires 30 and the sheet-shaped member 20 or the like, and thus the wires 30 and the sheet-shaped member 20 are kept in the state of being fixed to each other. In the present example, it is envisioned that the wires 30 and the sheet-shaped member 20 are in a state of contact site fixing. The descriptions relating to contact site fixing can also be applied to non-contact site fixing as long as it is not a configuration to which contact site fixing cannot be applied.

As the mode of contact site fixing, contact site indirect fixing may be used, contact site direct fixing may be used, or both may be used in different regions. Here, in contact site indirect fixing, the wires 30 and the sheet-shaped member 20 are fixed to each other by sticking together indirectly via an intervening member such as an adhesive, a pressure sensitive adhesive, or double-sided adhesive tape provided therebetween. Also, in contact site direct fixing, the wires 30 and the sheet-shaped member 20 are fixed to each other by sticking together directly without use of a separately-provided adhesive or the like. In contact site direct fixing, for example, it is conceivable that the wires 30 and the sheet-shaped member 20 are fixed by sticking together due to resin included in at least one of the wires 30 and the sheet-shaped member 20 being melted. Hereinafter, the wires 30 and the sheet-shaped member 20 will be described as being in a state of contact site direct fixing. The descriptions relating to contact site direct fixing can be applied also to contact site indirect fixing, as long as it is not a configuration to which contact site direct fixing cannot be applied.

When the state of contact site direct fixing is formed, it is also conceivable that the resin is melted by heat, or is melted using a solvent. That is, the state of contact site direct fixing may also be a state of contact site direct fixing achieved through heat, or may be a state of contact site direct fixing achieved using a solvent. It is preferable that the state is the state of contact site direct fixing achieved through heat.

There is no particular limitation on the configuration of forming the state of contact site direct fixing at this time, and various types of configurations including known configurations such as welding, fusion, and fusion welding can be used. For example, if the state of contact site direct fixing achieved through heat is formed through welding, it is possible to use various welding configurations, such as ultrasonic welding, pressurized heat welding, hot-air welding, and high-frequency welding. When the state of contact site direct fixing is formed through these configurations, the wires 30 and the sheet-shaped member 20 are put in a state of contact site direct fixing achieved through the configuration. Specifically, for example, when the state of contact site direct fixing is formed through ultrasonic welding, the wires 30 and the sheet-shaped member 20 are put in a state of contact site direct fixing achieved through ultrasonic welding. The portions (fixed portions of the wires 30 and the sheet-shaped members 20) obtained by forming the state of contact site direct fixing achieved through heat through welding may also be referred to as welded portions, and among them, a fixed portion achieved through ultrasonic welding may be referred to as an ultrasonic-welded portion, a fixed portion achieved through pressurized heat welding may be referred to as a pressurized-heat-welded portion, and the like.

In the case of contact site direct fixing, only the resin included in the coverings of the wires 30 may be melted, or only the resin included in the sheet-shaped member 20 may be melted. In these cases, a state is entered in which the melted resin sticks to the other outer surface, and a relatively distinct interface is formed in some cases. Also, in the case of contact site direct fixing, both the resin included in the covering of the wires 30 and the resin included in the sheet-shaped member 20 may be melted. In this case, both resins mix together and a distinct interface is not formed in some cases. In particular, if the covering of the wires 30 and the sheet-shaped member 20 include resin that is easily compatibilized, such as the same resin materials, or the like, both resins mix together and a distinct interface is not formed in some cases.

The form in which the above-described wiring member 10 is folded, that is, the wiring member 10B in the packaged form, is in a state in which the intersection locations 38a, 38b, 38c, 38d, and 39 of the multiple wires 30 are located away from the bending locations 12A and 13A (see FIG. 2). When the packaged form is expanded, a state is entered in which the intersection locations 38a, 38b, 38c, 38d, and 39 of the multiple wires 30 are located away from the bending tracks 12 and 13, which are the tracks of the folding locations 12A and 13A (see FIG. 1). The folding tracks 12 and 13 are observed as tracks remaining as creases on the sheet-shaped member 20, or tracks remaining as creases on the wires 30.

According to the thus-configured wiring member 10B in the packaged form, the intersection locations 38a, 38b, 38c, 38d, and 39 of the multiple wires 30 are located away from the bending locations 12A and 13A of the sheet-shaped member 20, and therefore a case is suppressed in which the paths of the wires 30 are disturbed on the sheet-shaped member 20 or the wires 30 separate from the sheet-shaped member 20. Also, in the wiring member 10 as well, the intersection locations 38a, 38b, 38c, 38d, and 39 of the multiple wires 30 are located away from the folding tracks 12 and 13 of the sheet-shaped member 20, and therefore during packaging, shipping, or the like, the sheet-shaped member 20 is folded away from the intersection locations 38a, 38b, 38c, 38d, and 39 of the multiple wires 30. For this reason, a case is suppressed in which the paths of the wires 30 are disturbed on the sheet-shaped member 20 or the wires 30 separate from the sheet-shaped member 20.

Also, since the wiring member 10 is folded during packaging, shipping, and the like in order to achieve compactness, there is little likelihood that the wiring member 10 will be folded at a position near the end portion of the sheet-shaped member 20. In view of this, due to the intersection locations 38a and 39 of the wires 30 being located near the end portion T between the central portion M in the extension direction of the sheet-shaped member 20 and the end portion T, the likelihood that the intersection locations 38a and 39 of the multiple wires 30 will be folded decreases, and a case is suppressed in which the paths of the wires 30 are disturbed on the sheet-shaped member 20 or the wires 30 separate from the sheet-shaped member 20.

{Variations}

Various variations will be described premised on the above-described embodiment.

Figure 3:
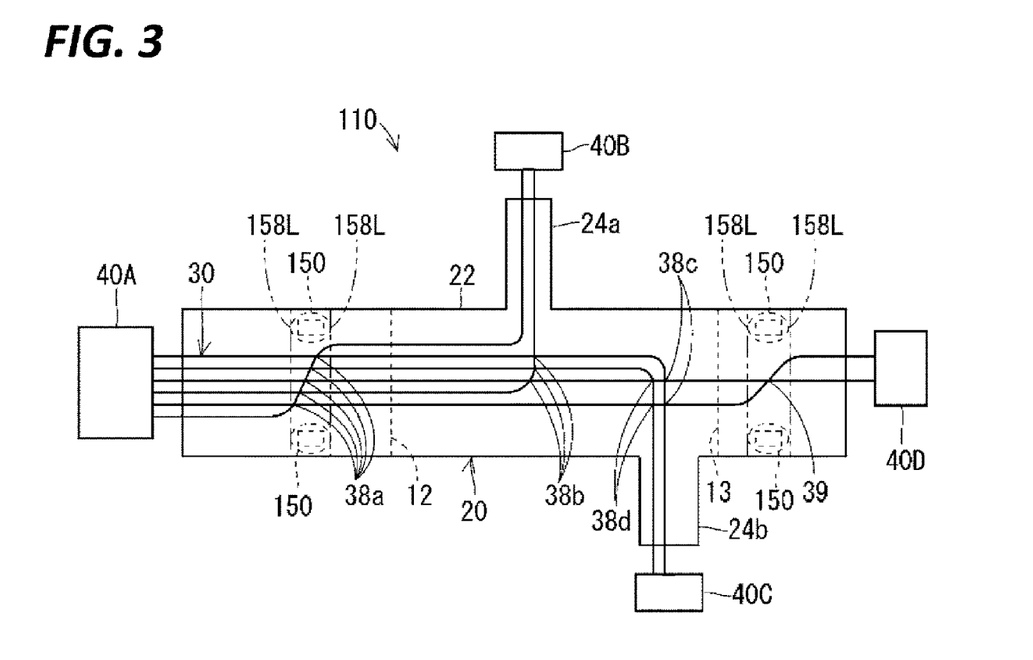
FIG. 3 is an overall plan view showing a wiring member according to a first variation.

FIG. 3 is an overall plan view showing a wiring member 110 according to a first variation. This wiring member 110 further includes a vehicle fixing portion 150 that is attached to the sheet-shaped member 20.

The vehicle fixing portion 150 is a component that can be fixed to the vehicle. For example, a component that can engage and be fixed by being fit into a hole formed in the vehicle, or a component called a clamp or a clip, can be used as the vehicle fixing portion 150. Various types of fixing structures, such as fixing using ultrasonic welding, thermal welding, an adhesive, or a pressure-sensitive adhesive, or grip fixing, can be employed as the fixing structure of the vehicle fixing portion 150 to the sheet-shaped member 20.

The vehicle fixing portion 150 is fixed to a portion in the extension direction of the first sheet-shaped portion 22 of the sheet-shaped member 20. Here, the vehicle fixing portion 150 is provided between one end portion of the first sheet-shaped portion 22 and the folding track 12. The vehicle fixing portion 150 is provided on both side portions of the first sheet-shaped portion 22. The vehicle fixing portion 150 may also be provided on only one side of the first sheet-shaped portion 22, and may be provided in the central portion in the width direction of the first sheet-shaped portion 22.

The intersection location 38a is located in a region of the sheet-shaped member 20 that corresponds to the vehicle fixing portion 150. Here, the intersection location 38a is located inside of a pair of lines 158L obtained by extending both ends of the vehicle fixing portion 150 in the extension direction of the first sheet-shaped portion 22 in the direction orthogonal to the extension direction of the first sheet-shaped portion 22.

The vehicle fixing portion 150 is provided also between the other end portion of the first sheet-shaped portion 22 and the bending track 13. The intersection location 39 is located in a region of the sheet-shaped member 20 that corresponds to the vehicle fixing portion 150.

The vehicle fixing portion 150 is a component that is made of resin, metal, or the like, and the first sheet-shaped portion 22 is difficult to bend at the region in which the vehicle fixing portion 150 is provided. For this reason, the sheet-shaped member 20 is folded at a position away from the vehicle fixing portion 150. For this reason, the wiring member 110 is not folded at the intersection locations 38a and 39, and a case is suppressed in which the paths of the wires 30 are disturbed on the sheet-shaped member 20 or the wires 30 separate from the sheet-shaped member 20.

Figure 4:
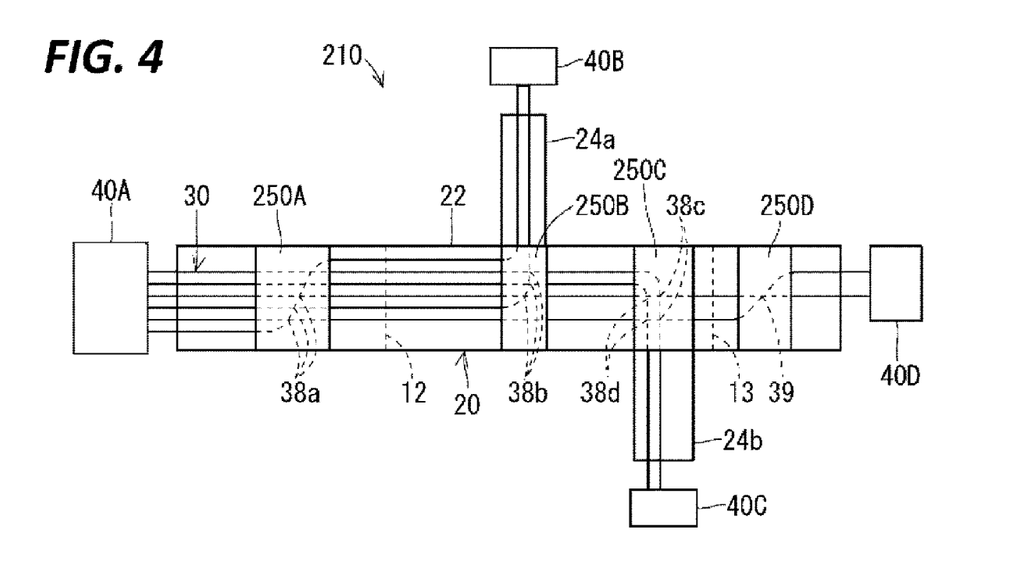
FIG. 4 is an overall plan view showing a wiring member according to a second variation.

FIG. 4 is an overall plan view showing a wiring member 210 according to a second variation. This wiring member 210 is provided with rigidity providing members 250A, 250B, 250C, and 250D that provide rigidity to the intersection locations 38a, 38b, 38c, 38d, and 39.

The rigidity providing members 250A, 250B, 250C, and 250D are formed into sheet shapes, and are fixed to the sheet-shaped member 20 so as to cover the wires 30 from the side on which the wires 30 are fixed to the sheet-shaped member 20. The rigidity providing member 250A covers the entire region in the width direction of the first sheet-shaped portion 22 including the intersection location 38a so as to provide rigidity to the intersection location 38a. The rigidity providing member 250B covers the entire region in the width direction of the first sheet-shaped portion 22 including the intersection location 38b so as to provide rigidity to the intersection location 38b. The rigidity providing member 250C covers the entire region in the width direction of the first sheet-shaped portion 22 including the intersection locations 38c and 38d so as to provide rigidity to the intersection locations 38c and 38d. The rigidity providing member 250D covers the entire region in the width direction of the first sheet-shaped portion 22 including the intersection location 39 so as to provide rigidity to the intersection location 39. The rigidity providing members 250A, 250B, 250C, and 250D do not need to cover the entirety in the width direction of the first sheet-shaped portion 22, but need only cover at least the intersection locations 38a, 38b, 38c, 38d, and 39. Also, the rigidity providing members 250A, 250B, 250C, and 250D need not be provided for all of the intersection locations 38a, 38b, 38c, 38d, and 39. The rigidity providing members may also be provided at only a portion of the intersection locations 38a, 38b, 38c, 38d, and 39.

The rigidity providing members 250A, 250B, 250C, and 250D may also be provided in a wider region for the sheet-shaped member 20. For example, the rigidity providing member may also be provided in the entire region away from the linear regions of the first sheet-shaped member 22 that are to be the folding tracks 12 and 13.

Resin sheets of PVC, PE, PET, PP, PA, or the like, or metal sheets of aluminum, copper, or the like may be used as the rigidity providing members 250A, 250A, 250B, 250C, and 250D. Also, the rigidity providing members 250A, 250A, 250B, 250C, and 250D may be a resin material such as a woven fabric, a knitted fabric, or a nonwoven fabric, or may be a molded material such as a member obtained through extrusion molding, injection molding, or the like. Also, the rigidity providing members 250A, 250A, 250B, 250C, and 250D may be a foam material that is foam-molded, or may be a solid material that is uniformly solid without being foam-molded. Also, the rigidity providing members 250A, 250A, 250B, 250C, and 250D may have only one layer, or may have multiple layers.

The fixing of the rigidity providing members 250A, 250A, 250B, 250C, and 250D to the sheet-shaped members 20 may be performed using any configuration. For example, the rigidity providing members 250A, 250A, 250B, 250C, and 250D may also be fixed to the sheet-shaped member 20 in a lateral region of the main surface of the sheet-shaped member 20 away from the paths of the wires 30. Also, the rigidity providing members 250A, 250A, 250B, 250C, and 250D may also be fixed to the sheet-shaped member 20 in the entire region in the width direction of the sheet-shaped member 20.

A configuration that is the same as that in which the wires 30 are fixed to the sheet-shaped member 20 can be employed as the fixing mode of the cover 160 and the sheet-shaped member 20. That is, the fixing mode of both members may be contact site fixing, non-contact site fixing, or both. Also, as the mode of contact site fixing, contact site indirect fixing may be used, contact site direct fixing may be used, or both may be used in different regions. For example, the rigidity providing members 250A, 250A, 250B, 250C, and 250D can be fixed to the sheet-shaped member 20 using ultrasonic welding, pressurized heat welding, hot-air welding, high-frequency welding, or the like.

According to this variation, the rigidity providing members 250A, 250B, 250C, and 250D that provide rigidity to the intersection locations 38a, 38b, 38c, 38d, and 39 are provided, and therefore the wiring member 10 is difficult to bend at the intersection locations 38a, 38b, 38c, 38d, and 39. For this reason, a case is suppressed in which the paths of the wires 30 are disturbed on the sheet-shaped member 20 or the wires 30 separate from the sheet-shaped member 20. Also, since the rigidity providing members 250A, 250B, 250C, and 250D cover the intersection locations 38a, 38b, 38c, 38d, and 39, from this viewpoint as well, a case is suppressed in which the paths of the wires 30 are disturbed on the sheet-shaped member 20 or the wires 30 separate from the sheet-shaped member 20.

Figure 5:
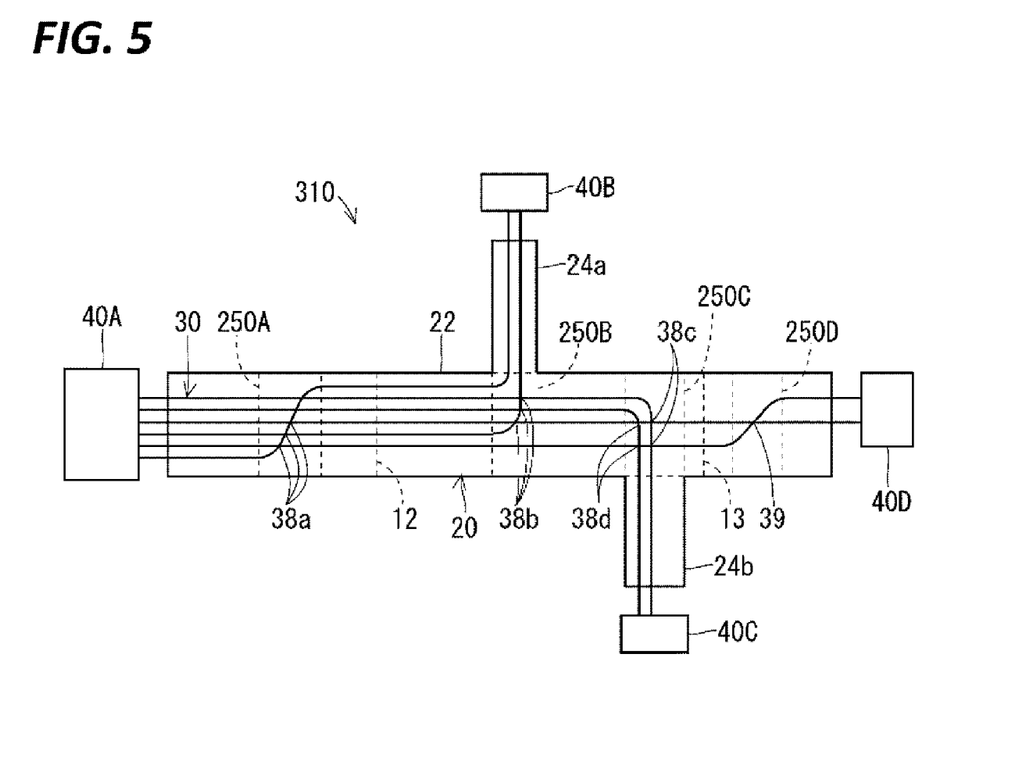
FIG. 5 is an overall plan view showing a wiring member according to a third variation.

It is not essential that the rigidity providing members 250A, 250A, 250B, 250C, and 250D cover the intersection locations 38a, 38b, 38c, 38d, and 39. For example, as with a wiring member 310 according to a third variation shown in FIG. 5, the rigidity providing members 250A, 250A, 250B, 250C, and 250D may be fixed to the sheet-shaped member 20 from the side opposite to the side on which the wires 30 are fixed to the sheet-shaped member 20.

Note that the configurations described in the embodiment and variations above can be combined as appropriate as long as no discrepancy occurs. For example, the rigidity providing members 250A, 250B, 250C, and 250D according to the second variation may also be provided on the wiring member 110 according to the first variation shown in FIG. 3.

Although the invention was described in detail above, the above description is in all aspects exemplary, and the invention is not limited thereto. It is understood that countless variations that have not been described as examples can be envisioned without departing from the scope of the invention.

LIST OF REFERENCE NUMERALS

10; 110; 210; 310 Wiring member
10B Wiring member in packaged form
12, 13 Folding track
20 Sheet-shaped member
30, 30a, 30b, 30c, 30d, 30e, 30f Wire
38a, 38b, 38c, 38d, 39 Intersection location
150 Vehicle fixing portion
250A, 250B, 250C, 250D Rigidity providing member

What is claimed is:
1. A wiring member comprising:
a sheet-shaped plate; and
a plurality of linear transmission channels fixed on the sheet-shaped plate,
wherein the plurality of linear transmission channels are fixed on the sheet-shaped plate such that a portion of the plurality of linear transmission channels intersects another linear transmission channel, and an intersection location of the plurality of linear transmission channels where the portion of the plurality of linear transmission channels intersects the another linear transmission channel is located away from a folding track that is a track along which the wiring member is folded when formed in a packaged form.

2. The wiring member according to claim 1, further comprising
a vehicle fixing portion attached to the sheet-shaped plate,
wherein the intersection location of the plurality of linear transmission channels includes an intersection location that is located in a region of the sheet-shaped plate that corresponds to the vehicle fixing portion.

3. The wiring member according to claim 1,
wherein the intersection location of the plurality of linear transmission channels includes an intersection location that is located near an end portion between a central portion in an extension direction of the sheet-shaped plate and the end portion.

4. The wiring member according to claim 1,
wherein a rigidity providing plate that provides rigidity to the intersection location is provided.

5. A wiring member in a packaged form, comprising:

a sheet-shaped plate; and a plurality of linear transmission channels fixed on the sheet-shaped plate, wherein the plurality of linear transmission channels are fixed on the sheet-shaped plate such that a portion of the plurality of linear transmission channels intersects another linear transmission channel, the sheet-shaped plate and the plurality of linear transmission channels are folded to be put in a packaged form, and an intersection location of the plurality of linear transmission channels is located away from a folding location.

* * * * *